United States Patent
Xu et al.

(10) Patent No.: US 8,198,872 B2
(45) Date of Patent: Jun. 12, 2012

(54) STARTER-GENERATOR WITH IMPROVED EXCITATION

(75) Inventors: Ming Xu, Oro Valley, AZ (US); Cristian Anghel, Oro Valley, AZ (US); Wayne Pearson, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 588 days.

(21) Appl. No.: 12/401,536

(22) Filed: Mar. 10, 2009

(65) Prior Publication Data

US 2010/0231181 A1    Sep. 16, 2010

(51) Int. Cl.
*H02P 9/10* (2006.01)
(52) U.S. Cl. .......................................... 322/59
(58) Field of Classification Search .................... 322/59, 322/87; 310/156.01–156.84, 81
See application file for complete search history.

(56) References Cited

U.S. PATENT DOCUMENTS

| | | | | |
|---|---|---|---|---|
| 5,663,605 A | * | 9/1997 | Evans et al. ................... | 310/181 |
| 6,147,429 A | * | 11/2000 | Akemakou et al. ........... | 310/181 |
| 6,940,197 B2 | | 9/2005 | Fujita | |
| 2006/0138979 A1 | | 6/2006 | Kuribayashi | |
| 2007/0090713 A1 | * | 4/2007 | Arita et al. .................... | 310/181 |
| 2008/0303490 A1 | * | 12/2008 | Xu et al. ........................ | 322/29 |

* cited by examiner

*Primary Examiner* — Nguyen N Hanh
(74) *Attorney, Agent, or Firm* — Shimokaji & Assoc., PC

(57) ABSTRACT

An electrical power system may comprise a main generator with a rotor having field windings and at least one embedded permanent magnet. A generator control unit (GCU) may be connected to receive excitation current produced by the main generator with flux from the at least one permanent magnet. An exciter generator may be connected to be provided with excitation from the GCU. The exciter generator may provide excitation current to the field windings of the main generator. The main generator may produce output current from flux from the field windings and the at least one permanent magnet.

6 Claims, 8 Drawing Sheets

STARTER-GENERATOR WITH IMPROVED EXCITATION

BACKGROUND OF THE INVENTION

The present invention generally relates to methods and apparatus for providing excitation for electric machines and, more particularly, improved rotors for electric machines which may operate as starter-generators in vehicles such as aircraft.

A prior art starter-generator may be constructed as a three stage electric machine. A first stage may comprise a permanent magnet generator (PMG); a second stage may be an exciter generator; and a third stage may be a main generator. When the prior art starter-generator is operated in a generating mode, the PMG may provide excitation for the exciter generator and the exciter generator may then provide excitation for the main generator. When the prior art starter-generator is operated in a starter mode to, for example, start an aircraft main engine, excitation for the main generator may be provided from a ground-based power source or from an on-board auxiliary power unit (APU).

It is a continuing goal of vehicle designers to reduce weight and cost of on-board components. In that regard, there is a need to provide for more efficient provision of excitation for a starter-generator. There is a need to reduce requirements for external excitation power during engine starting. There is also a need to eliminate a requirement to provide a PMG to provide initial excitation during power generation.

SUMMARY OF THE INVENTION

In one aspect of the present invention, an electrical power system comprises a main generator comprising a rotor with field windings and at least one embedded permanent magnet; a generator control unit (GCU) is connected to receive excitation current produced by the main generator with flux from the at least one permanent magnet; an exciter generator is connected to be provided with excitation from the GCU. The exciter generator provides excitation current to the field windings of the main generator; and the main generator produces output current from flux from the field windings and the at least one permanent magnet.

In another aspect of the present invention, a self-exciting starter-generator comprises stator windings; and a rotor comprising a plurality of field windings; a plurality of permanent magnets interposed between the field windings and positioned adjacent to d-axes of poles of the rotor; wherein the permanent magnets are oriented so that their respective direction of magnetization has a non-zero angular alignment a with their respective adjacent d-axis and wherein the permanent magnets provide flux which, when combined with rotation of the rotor, produce excitation current in the stator windings.

In still another aspect of the present invention a method for producing electrical power comprises the steps of rotating a rotor of a main generator; producing rotating flux and current in the main generator stator windings; transferring this current to an exciter generator; generating output current from the exciter generator to provide excitation current for field windings of the main generator; and producing output current from the main generator from flux produced in the field windings.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention may be useful in generating electrical power and in starting an engine of a vehicle. More particularly, embodiments of the present invention may provide a starter-generator with self excitation. Embodiments of the present invention may be particularly useful in vehicles such as aircraft which may benefit from electrical equipment that has reduced weight, cost and complexity.

Figure 1:
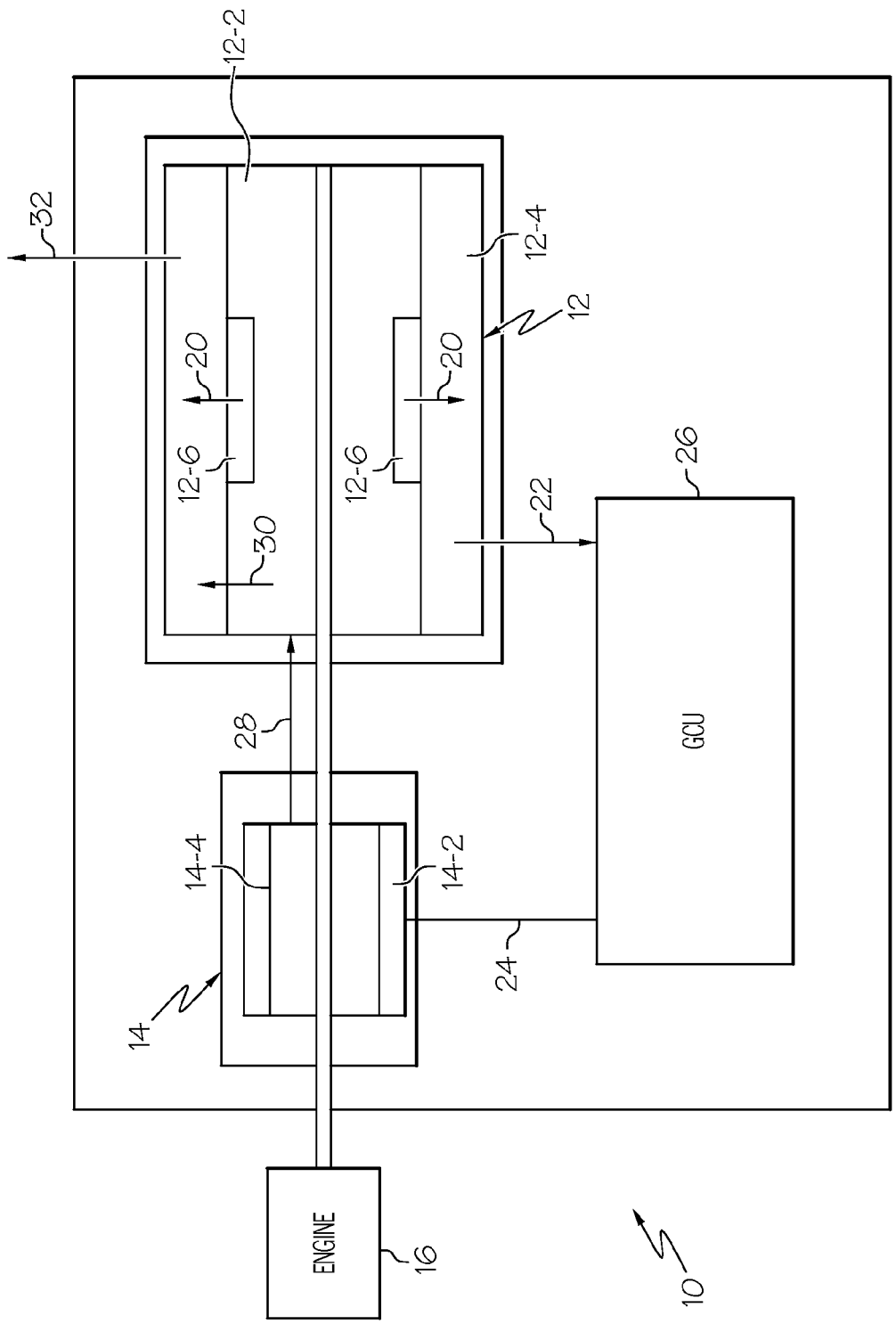
FIG. 1 is a block diagram of a power system in accordance with an embodiment of the present invention.

Referring now to FIG. 1, a block diagram may portray an exemplary embodiment of the invention. A power system 10 may comprise starter-generator or main generator 12 and an exciter generator 14. The main generator 12 and the exciter generator 14 may be connected to a prime mover or engine 16 with a shaft 18. In a generating mode, the engine 16 may drive the shaft 18 to provide torque to the exciter generator 14 and the main generator 12. In a starting mode, the main generator 12 may provide torque to rotate the shaft 18 and thus start the engine 16.

FIG. 1 may illustrate how permanent-magnet excitation of the main generator 12 may be utilized in an exemplary embodiment of the invention. A rotor 12-2 of the main generator 12 may be provided with embedded permanent magnets 12-6. The permanent magnets 12-6 may produce magnetic flux which may be represented by arrows designated by the numeral 20. Presence of the flux 20 combined with rotation of the rotor 12-2 may produce current 22 which may be used to supply the generator control unit (GCU) 26 which may then supply excitation current 24 for the exciter generator 14. Thus, there may be no need for a separate permanent magnet generator (PMG) such as that used in prior art starter-generators.

Presence of the current 24 in the exciter generator stator windings 14-2 combined with rotation of a rotor 14-4 of the exciter generator 14 may induce a back EMF and output current, designated by an arrow 28, from the rotor 14-4. The output current 28 may be provided to the field windings 12-12 (See FIG. 2 hereinbelow) of the rotor 12-2 of the main generator 12 as excitation current. The current 28 may produce field-winding flux, represented by arrow 30, which may combine with the flux 20 from the permanent magnets 12-6. The combined flux 20 and 30 combined with rotation of the rotor 12-2 may induce output current, designated by an arrow 32 from the main generator 12. The GCU 26 may operate in a conventional manner to control a level of excitation of the exciter generator 14 and thus control a level of the output current of the main generator 12.

In the context of the power system 10 used as a starter, it may be noted that induced back electromotive force (EMF) in the main stator windings 12-4 may provide power for a connected electrical load such as the GCU 26. When current is applied to the main stator windings 12-4 interaction of this applied current with the flux 30 may produce torque. This power or torque from the flux 30 may be additive with power or torque that may be produced by the flux 20. Consequently, for a given torque requirement, the required electrical excitation may be reduced from that required in prior art starters.

It may be noted that that although the permanent magnets 12-6 shown in FIG. 1 occupy only a central axial portion of the main generator rotor 12-2, the permanent magnets 12-6 may be extended to cover the whole axial length of the rotor 12-2.

Figure 2:
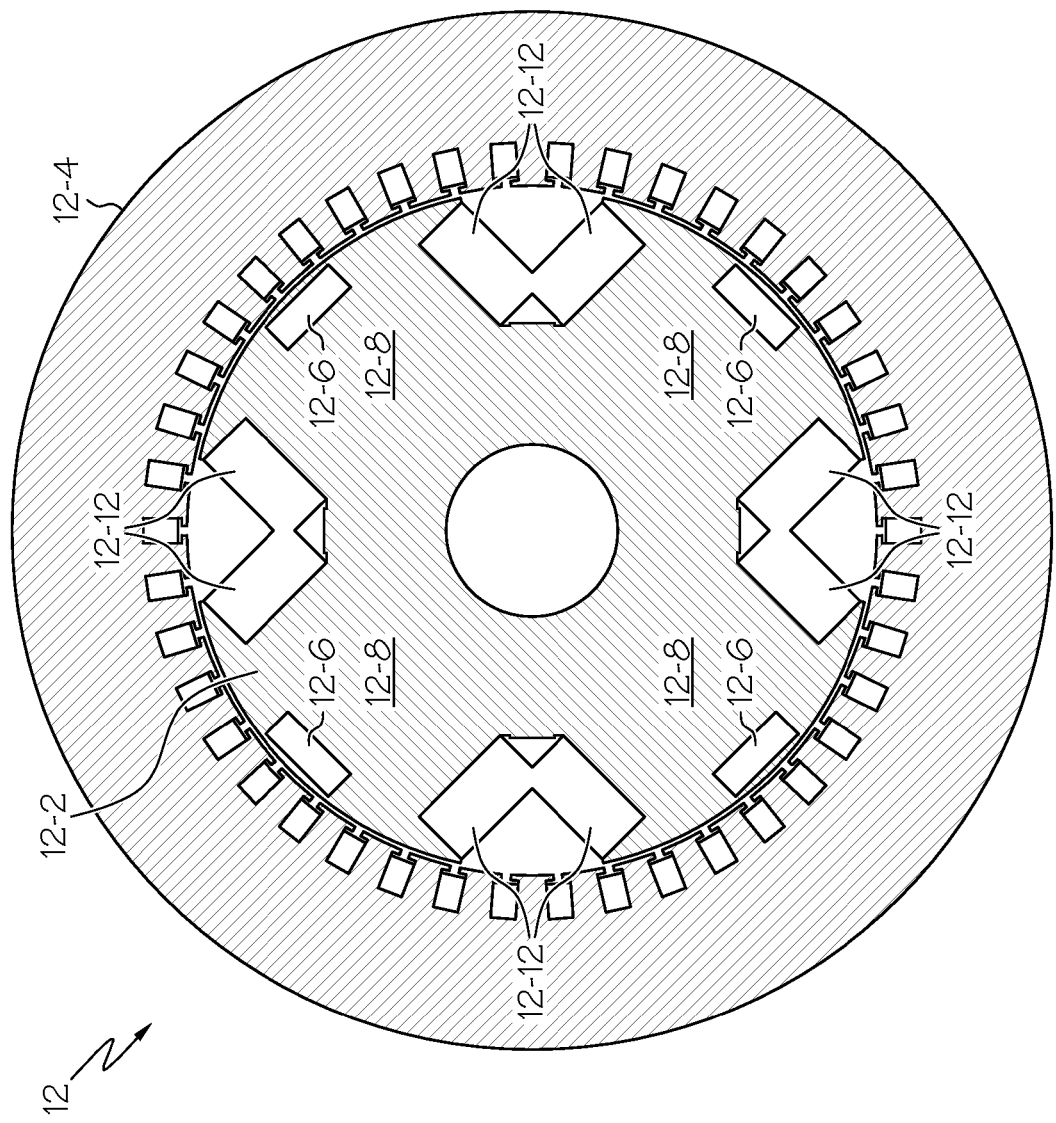
FIG. 2 is a cross sectional illustration of a main generator in accordance with a first embodiment of the present invention.

Referring now to FIG. 2, it may be seen how, in an exemplary embodiment of the invention, the magnetic flux may be produced by the main generator 12. In FIG. 2, a cross-sectional view through the main generator 12 shows the rotor 12-2 and the stator windings 12-4. The rotor 12-2 may be provided with at least one of the permanent magnets 12-6 at each pole 12-8 of the rotor. During rotation of the rotor 12-2, flux from the permanent magnets 12-6 may induce current 22 in the stator windings 12-4, Referring now to FIG. 3, in an exemplary embodiment of the invention there may be a pair of the permanent magnets 12-6 at each of the poles 12-8. The magnets 12-6 of each pair may be separated from one another with non-magnetic material 12-10. The magnets 12-6 may be oriented so that their magnetization direction, designated 40, is not aligned with the d-axis, designated 42, of the pole 12-8. In other words, the magnetization direction 40 may be oriented at a non-zero angle α with respect to the d-axis 42. Furthermore, the magnets 12-6 may be placed on the rotor 12-2 in pairs with each of the magnets 12-6 of the pair having their respective magnetization directions 40 oriented at mirror-image angular relationships to the d-axis 42.

Figure 3:
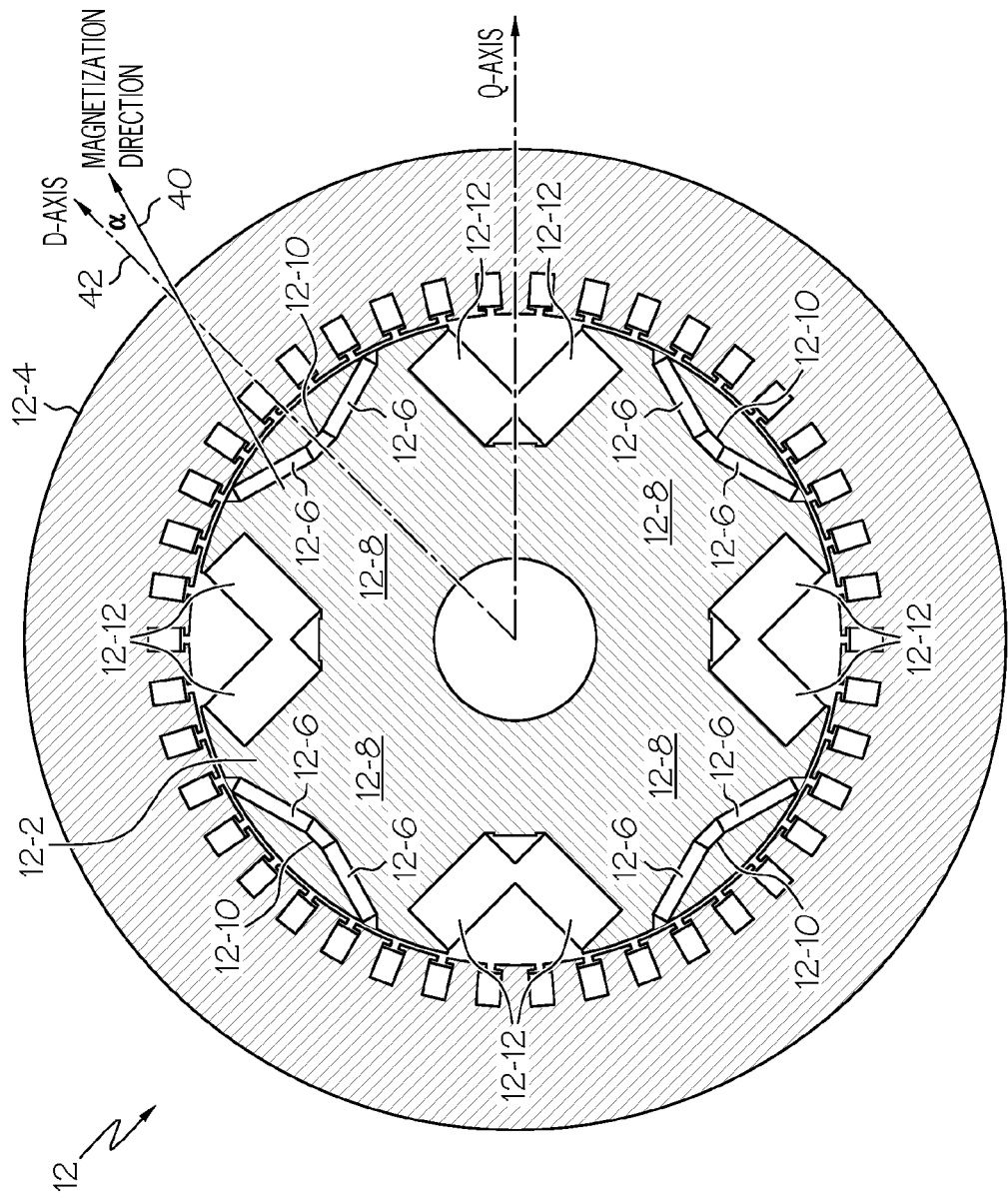
FIG. 3 is a cross sectional illustration of a main generator in accordance with a second embodiment of the present invention.

The configuration illustrated in FIG. 3 may be advantageous in the context of the main generator 12 being employed as an engine starter. When the main generator 12 is used to start the engine 16, excitation current may be provided from an external power source such an auxiliary power unit (APU) or a ground source (not shown) through the GCU 26 to the exciter generator 14. Starting torque is related to an amount of excitation current that can be supplied through the GCU 26. It may be seen that when the main generator 12 has a capability for providing some excitation current via the permanent magnets 12-6, then some torque may be derived from the interaction of rotating flux and stator windings current. Thus, for a prescribed amount of starting torque, there may be a reduction in a required amount of external excitation current as a consequence of producing some starting torque with the flux 20 generated by the permanent magnets 12-6. This may result in an opportunity to reduce the overall size of the GCU 26 from GCU's of the prior art.

It has been found that, as compared to a single magnet at each pole, the use of pairs of the magnets 12-6 may provide increased torque and reduced total harmonic distortion (THD). Without being limited to a particular theory, the beneficial effects derived from use of pairs of the magnets 12-6 may be understood by considering a vector diagram of FIG. 4.

Figure 4:
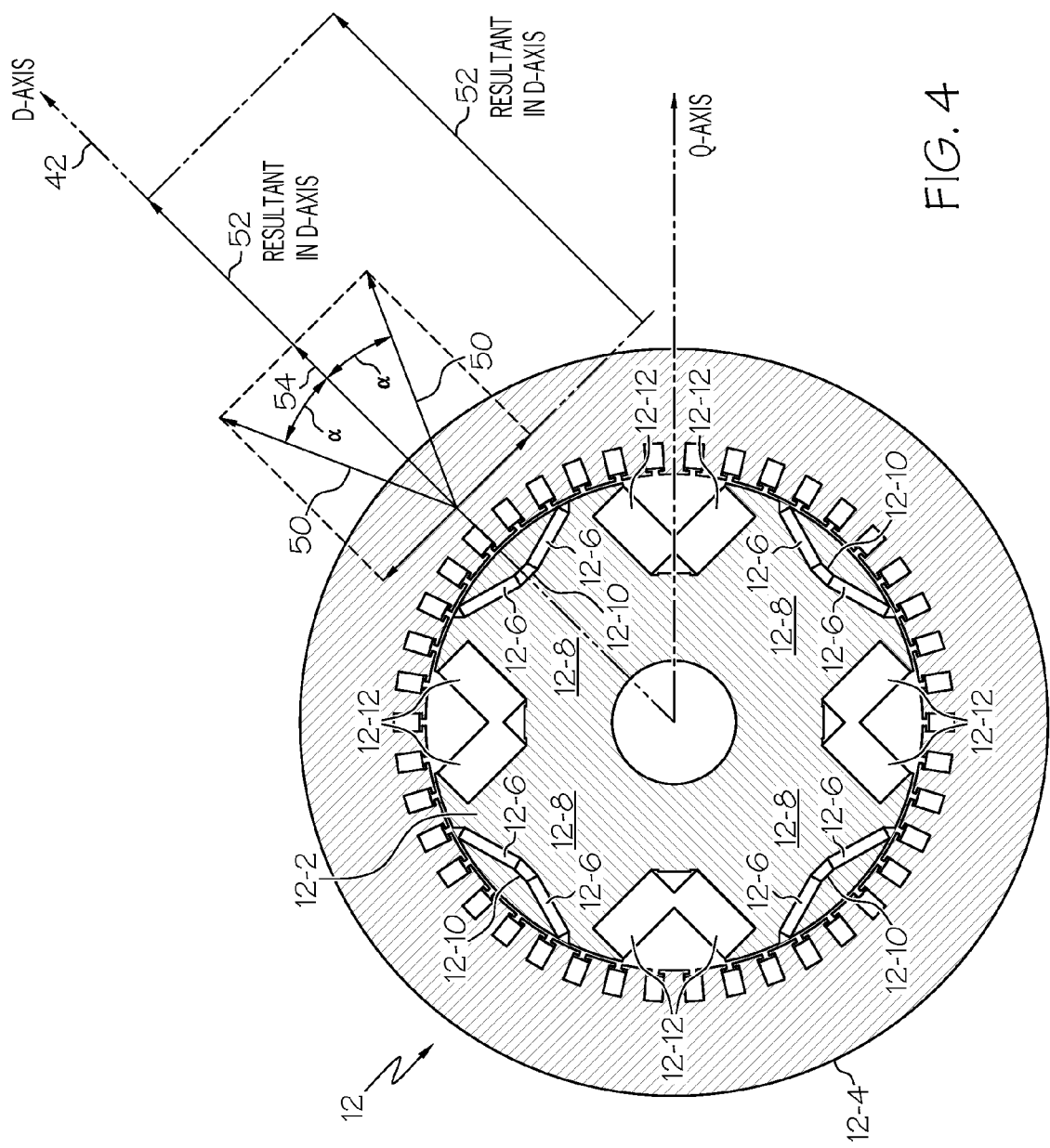
FIG. 4 is a vector diagram of magnetomotive force (MMF) in accordance with the second embodiment of the present invention.

Referring now to FIG. 4, vector lines 50 may represent direction and magnitude of magnetomotive force (MMF) for the magnet 12-6. Each vector line 50 may resolve into two vector components; one along a d-axis, and the other perpendicular to the d-axis. The d-axis component of each magnet 12-6 may be represented by a vector line 54. A line 52 may represent magnitude and direction of the resultant d-axis MMF of one pair of the magnet 12-6. In other words, vector line 52 may have a magnitude twice the length of the d-axis component vector line 54. It may be seen that the line 52 may be smaller than the arithmetic sum of two of the lines 50. In other words, as compared to a single magnet, the pair of magnets may provide decreased d-axis flux and reactance. Thus even though the pair of magnets may produce a smaller difference between d-axis reactance and q-axis reactance, overall torque may be larger than that which may be produced with a single magnet.

The following torque formula may be useful in explaining how the torque may be increased by employing a pair of the magnets 12-6 oriented at a non-zero angle relative to the d-axis.

$$T=\{(3*E*V)/\Omega*Xd\}*\sin\theta+\{(3*V^2[Xd-Xq])/2*\Omega*Xd*Xq\}*\sin(2\theta)$$

where
- $Xd$=d-axis reactance
- $Xq$=q-axis reactance
- $V$=terminal voltage
- $E$=back EMF in armature winding
- $\Omega$=mechanical speed in radius per second and
- $\theta$=angle between E and V.

Figure 5A:
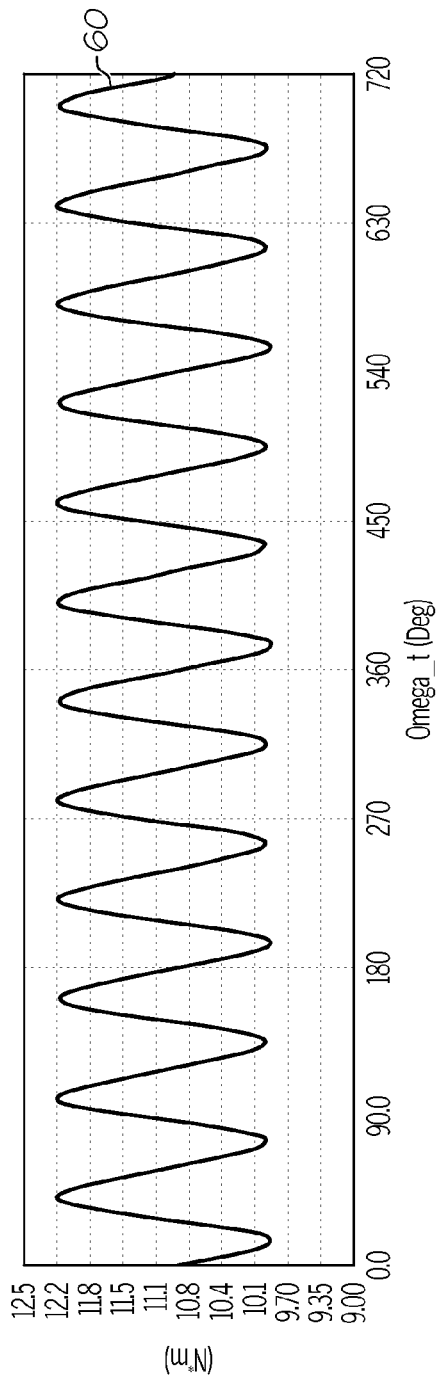
FIG. 5A is a graph of torque analysis simulation results in accordance with the first embodiment of the present invention.
Figure 5B:
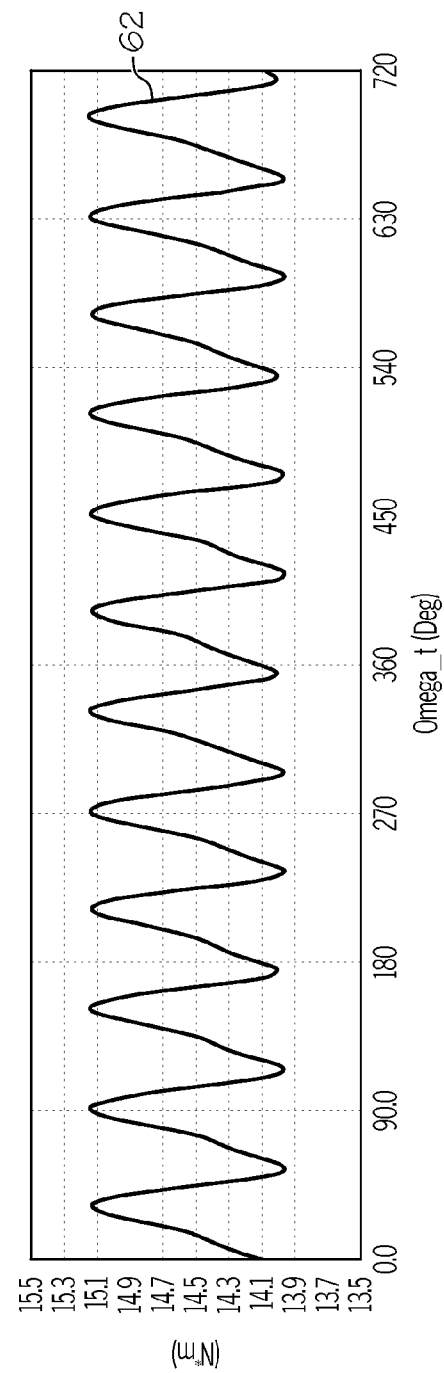
FIG. 5B is a graph of torque analysis simulation results in accordance with the second embodiment of the present invention.

Referring now to FIGS. 5A and 5B, results of a comparative torque-analysis simulation may be seen. In FIG. 5A, graph 60 may show torque attained with a magnet configuration illustrated in FIG. 2. In FIG. 5B a graph 62 may show torque that may be attained with a magnet configuration shown in FIG. 3. For purposes of a simulation, one of the magnets 12-6 of FIG. 2 may have the same magnitude of MMF as the arithmetic sum of the MMF of a pair of the magnets 12-6 of FIG. 3. It may be seen that average torque shown on graph 62 may be about 14.5 Newton-meters (N.M.) while average torque of graph 60 may be about 11 N.M. In other words, the magnet configuration of FIG. 3 may provide a torque increase of about 32% over torque that may be produced with the single-magnet configuration of FIG. 2.

Figure 6A:
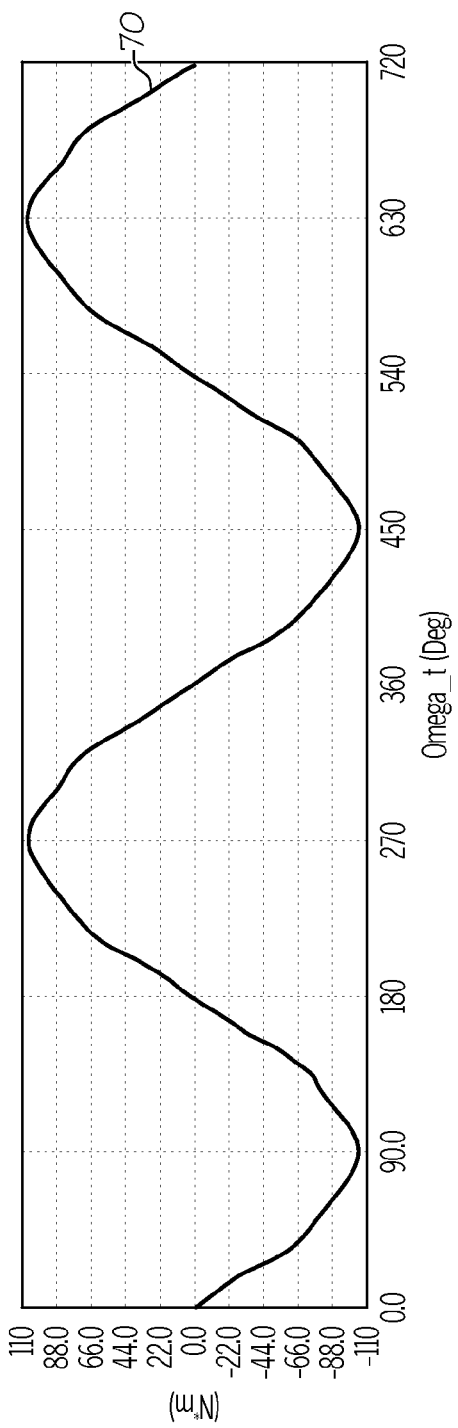
FIG. 6A is graph of output voltage of a main generator showing THD in accordance with the first embodiment of the present invention.
Figure 6B:
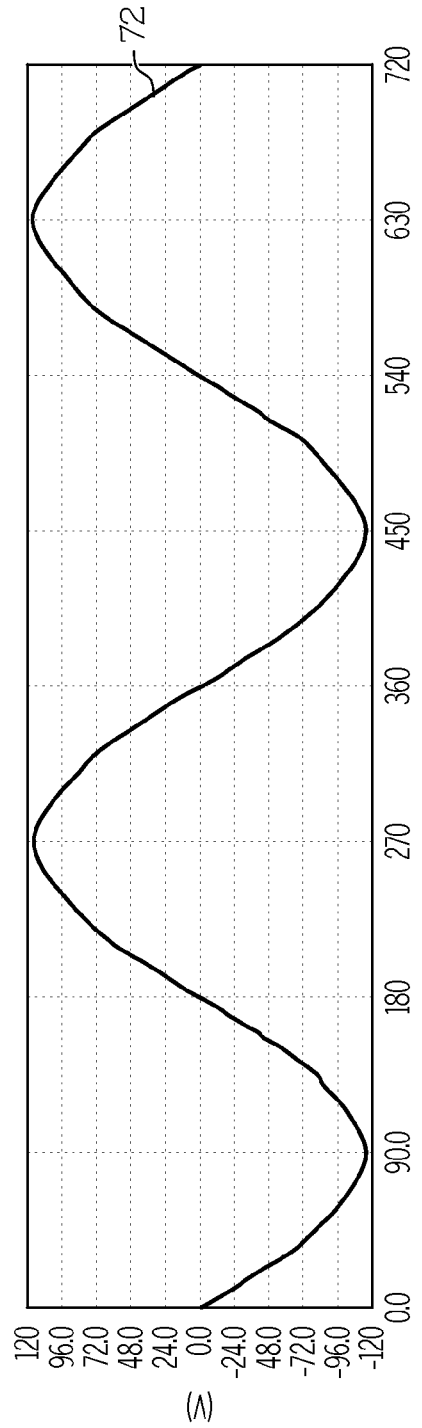
FIG. 6B is graph of output voltage of a main generator showing total harmonic distortion (THD) in accordance with a second embodiment of the present invention.

Referring now to FIGS. 6A and 6B, a set of graphs may illustrate an advantageous improvement of THD that may be provided by use of the magnet configuration of FIG. 3. A graph 70 in FIG. 6A may show voltage vs. rotation angle for a generator with the single-magnet configuration of FIG. 2. For the single-magnet configuration, the graph line 70, through application of Fourier analysis, may show THD that may be as high as 2.5%. A comparative graph line 72 in FIG.

6B may show a voltage vs. rotation angle relationship for one of the main generators 12 of the present invention configured as shown in FIG. 3. It may be seen that as compared to the graph 70, the graph 72 may show less THD. Through Fourier analysis the THD for the graph 72 may be quantified as being only about 1.5%.

Referring back now to FIG. 4, it has been found that varying the angle α may have various effects on improvement of performance of the power system 10. For example, as the angle α increases, d-axis reactance may decrease and as a result the main generator 12 may produce increased torque.

It must be noted however, that an increase in the angle α may have the effect of allowing an increase in THD. Without being limited to a particular theory, this effect of varying the angle α may be a result of the magnets 12-6 being less effective in reducing harmonics when their effect on d-axis reactance is reduced. As the angle α increases, the vector sum of MMF of the magnets 12-6 may be reduced and d-axis reactance is reduced. It has been found that THD may increase with decreasing contribution to overall d-axis reactance by the magnets 12-6.

It may be seen therefore that selection of any particular value for the angle α may determine a balance between increased torque and improved THD. In this context, increased torque and improved THD may be offsetting parameters. Depending on a desired application for the power system 10, Increased torque may be more valuable than improved THD. In that case, optimization of torque may be desired and the angle α may be made relatively large, e.g., about 30 degrees or greater. If on the other hand, an application of the power system 10 requires very low THD, then optimization of THD may be desired and the angle α may be made relatively small, e.g., about 15 degrees or less. An optimum angle α for a particular application may be determined through design optimization process based on particular design objectives and design restraints.

Figure 7:
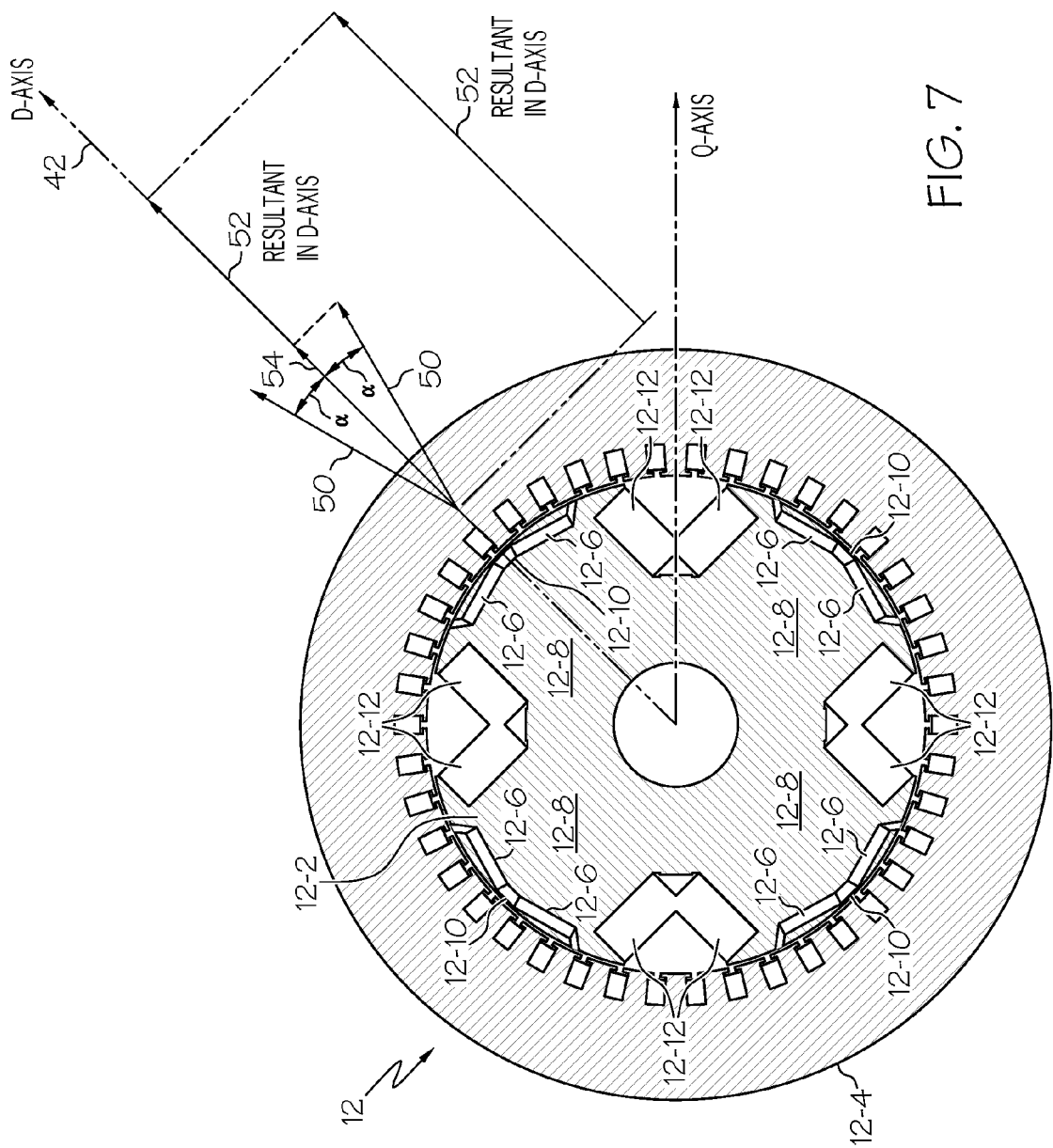
FIG. 7 is a vector diagram of MMF in accordance with a third embodiment of the present invention.

Referring now to FIG. 7, an exemplary embodiment of the present invention is illustrated in which the angle α may be relatively small, e.g., about 15 degrees or less. In FIG. 7, the permanent magnets 12-6 may be oriented so that their respective ends closest to the d-axis 42 may be at a greater radial distance than their opposite ends. This may be compared to the configuration of the main generator illustrated in FIG. 3. In FIG. 3 it may be noted that the permanent magnets 12-6 may be oriented so that their respective ends furthest from the d-axis 42 may be at a greater radial distance than their opposite ends.

Figure 8:
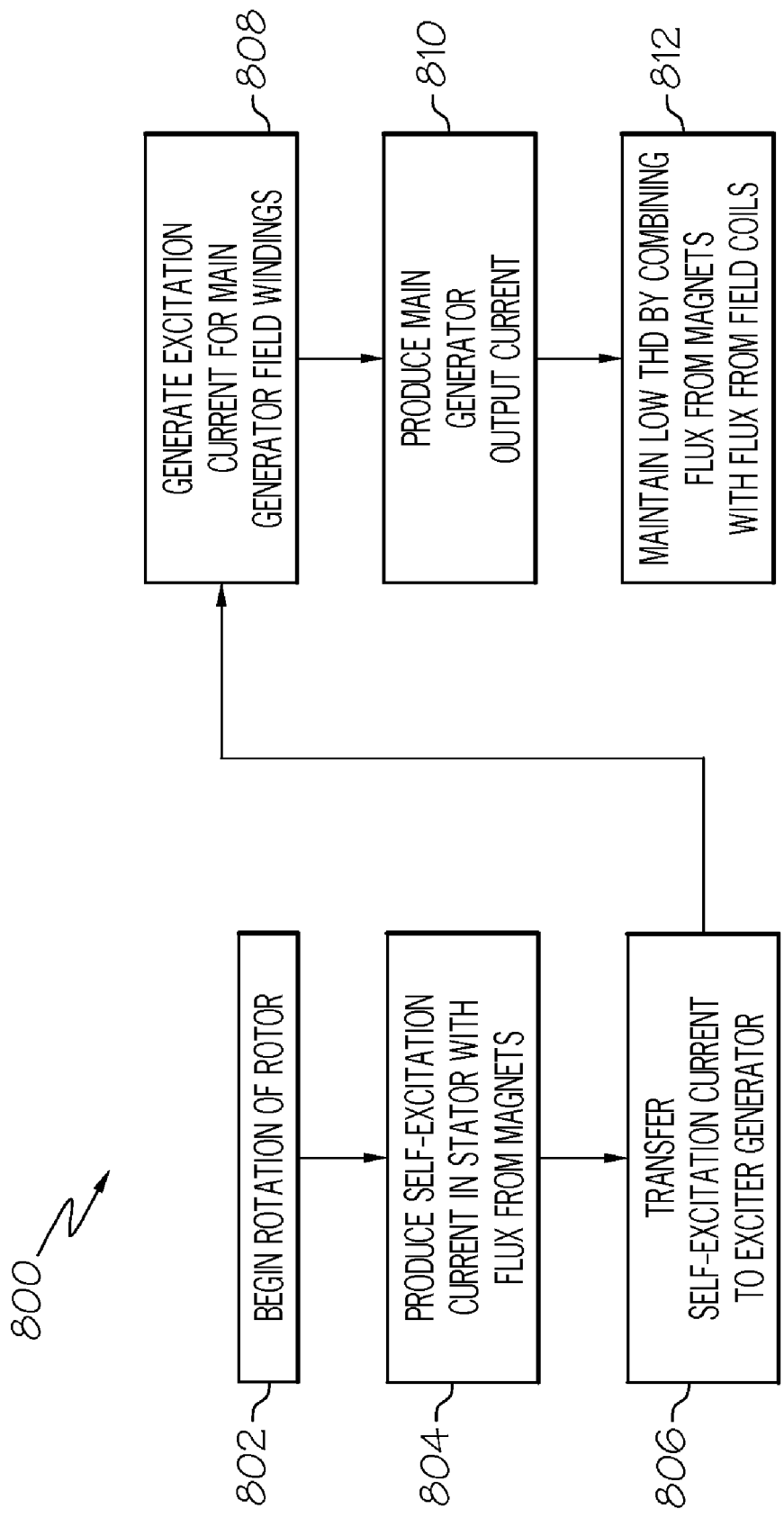
FIG. 8 is a flow chart of a method for producing electrical power in accordance with an embodiment of the present invention.

In one embodiment of the present invention, a method may be provided for producing electrical power in a vehicle such as, for example, an aircraft. In that regard the method may be understood by referring to FIG. 8. In FIG. 8, a flow chart portrays various aspects of an inventive method 800.

In a step 802, a generator rotor may be rotated (e.g., the engine 16 may rotate the shaft 18 to rotate the rotor 12-2 of the main generator 12). In a step 804, excitation current may be induced in stator windings of the main generator to supply current to a GCU (e.g., the magnets 12-6 may provide flux 20 which when combined with rotation of the rotor 12-2 may produce the current 22 in the stator windings 12-4 of the main generator 12). In a step 806, the excitation current may be transferred to an exciter generator (e.g., the excitation current 22 may be transferred to the GCU 26 to be conditioned and provided to the stator windings 14-2 of the exciter generator 14 as the resultant exciter current 24).

In a step 808, excitation current may be generated for field windings of the main generator (e.g., the exciter generator stator windings 14-2 may produce flux which, when combined with rotation of the exciter generator rotor 14-4, may produce the output current 28 for producing the flux 30 in the main generator 12) In a step 810, output current may be produced by the main generator (e.g., the flux 30 and the flux 20, combined with rotation of the rotor 12-2 may produce the output current 32). In a step 812, low THD of output voltage of the main generator may be maintained (e.g., by continued combination of the flux 20 from the permanent magnets and the flux 30 from the main generator rotor 12-2 during production of the output current 32).

It should be understood, of course, that the foregoing relates to exemplary embodiments of the invention and that modifications may be made without departing from the spirit and scope of the invention as set forth in the following claims.

We claim:

1. A self-exciting starter-generator comprising:
   stator windings;
   a rotor comprising;
   a plurality of field windings;
   a plurality of permanent magnets interposed between the field windings and positioned adjacent to d-axes of poles of the rotor;
   wherein the permanent magnets are oriented so that their respective directions of magnetization are oriented in a non-radial direction relative to a center of the rotor and so that their respective directions of magnetization intersect their respective adjacent d-axes at an angle α; and
   wherein the permanent magnets provide flux which, when combined with rotation of the rotor, produce current in the stator windings.

2. The starter-generator of claim 1 wherein the rotor comprises at least two poles.

3. The starter-generator of claim 1 further comprising:
   a pair of the permanent magnets positioned at each pole of the rotor; and
   wherein the pair of permanent magnets is positioned so that the d-axis of the pole passes between the permanent magnets of the pair.

4. The starter-generator of claim 3 wherein a first one of the permanent magnets of the pair has a magnetization direction with an angular alignment a relative to the d-axis that is equal in magnitude and has a mirror-image relationship to a second one of the permanent magnets of the pair.

5. The starter-generator of claim 4 wherein the angular alignment α is selectively optimized to reduce total harmonic distortion (THD) of output voltage of the starter-generator.

6. The starter-generator of claim 4 wherein the angular alignment α is selectively optimized to increase starting torque of the starter-generator.

* * * * *